(12) United States Patent
Taguchi et al.

(10) Patent No.: US 8,159,781 B2
(45) Date of Patent: Apr. 17, 2012

(54) MAGNETIC HEAD FOR PERPENDICULAR RECORDING AND DISK DRIVE WITH THE SAME

(75) Inventors: Tomoko Taguchi, Kunitachi (JP); Gaku Koizumi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/911,573

(22) Filed: Oct. 25, 2010

(65) Prior Publication Data

US 2011/0128652 A1 Jun. 2, 2011

(30) Foreign Application Priority Data

Nov. 30, 2009 (JP) .................................. 2009-272776

(51) Int. Cl.
*G11B 5/147* (2006.01)
(52) U.S. Cl. ................................. 360/125.3; 360/125.12
(58) Field of Classification Search .................. 360/313, 360/324, 123.12, 125.3, 128
See application file for complete search history.

(56) References Cited

U.S. PATENT DOCUMENTS

| | | | | |
|---|---|---|---|---|
| 7,817,375 B2* | 10/2010 | Sato et al. | ................. | 360/125.31 |
| 2007/0253107 A1 | 11/2007 | Mochizuki et al. | | |
| 2009/0052095 A1* | 2/2009 | Yamada et al. | ................ | 360/324 |
| 2009/0080106 A1* | 3/2009 | Shimizu et al. | .................. | 360/75 |
| 2009/0080120 A1* | 3/2009 | Funayama et al. | ............. | 360/319 |
| 2009/0109578 A1 | 4/2009 | Nishikawa | | |
| 2009/0201614 A1* | 8/2009 | Kudo et al. | ............... | 360/324.11 |
| 2009/0225465 A1* | 9/2009 | Iwasaki et al. | ................... | 360/75 |
| 2009/0316304 A1* | 12/2009 | Funayama et al. | .......... | 360/234.3 |
| 2010/0110592 A1* | 5/2010 | Koui et al. | ..................... | 360/324 |
| 2010/0134922 A1* | 6/2010 | Yamada et al. | ........... | 360/123.01 |
| 2011/0141629 A1* | 6/2011 | Braganca et al. | ............. | 360/313 |
| 2011/0205655 A1* | 8/2011 | Shimizu et al. | .................. | 360/39 |
| 2011/0205667 A1* | 8/2011 | Yamada et al. | ............... | 360/122 |

FOREIGN PATENT DOCUMENTS

| | | |
|---|---|---|
| JP | 2007-294059 | 11/2007 |
| JP | 2009-4089 | 1/2009 |
| JP | 2009-080867 | 4/2009 |
| JP | 2009-080875 A | 4/2009 |
| JP | 2009-104727 | 5/2009 |
| JP | 2010-257539 A | 11/2010 |

* cited by examiner

*Primary Examiner* — Brian Miller
(74) *Attorney, Agent, or Firm* — Knobbe, Martens, Olson and Bear, LLP

(57) ABSTRACT

According to one embodiment, a magnetic head includes a main pole configured to produce a recording magnetic field, a return pole opposed to a trailing side of the main pole across a write gap and configured to return magnetic flux from the main pole, a coil configured to excite the main pole, a spin-torque oscillator between the main pole and a surface of the return pole, configured to produce a high-frequency magnetic field, and side shields individually on opposite sides of the main pole transversely relative to a track, magnetically separated from the main pole, and located at a height position above the recording medium higher than that of the spin-torque oscillator.

20 Claims, 12 Drawing Sheets

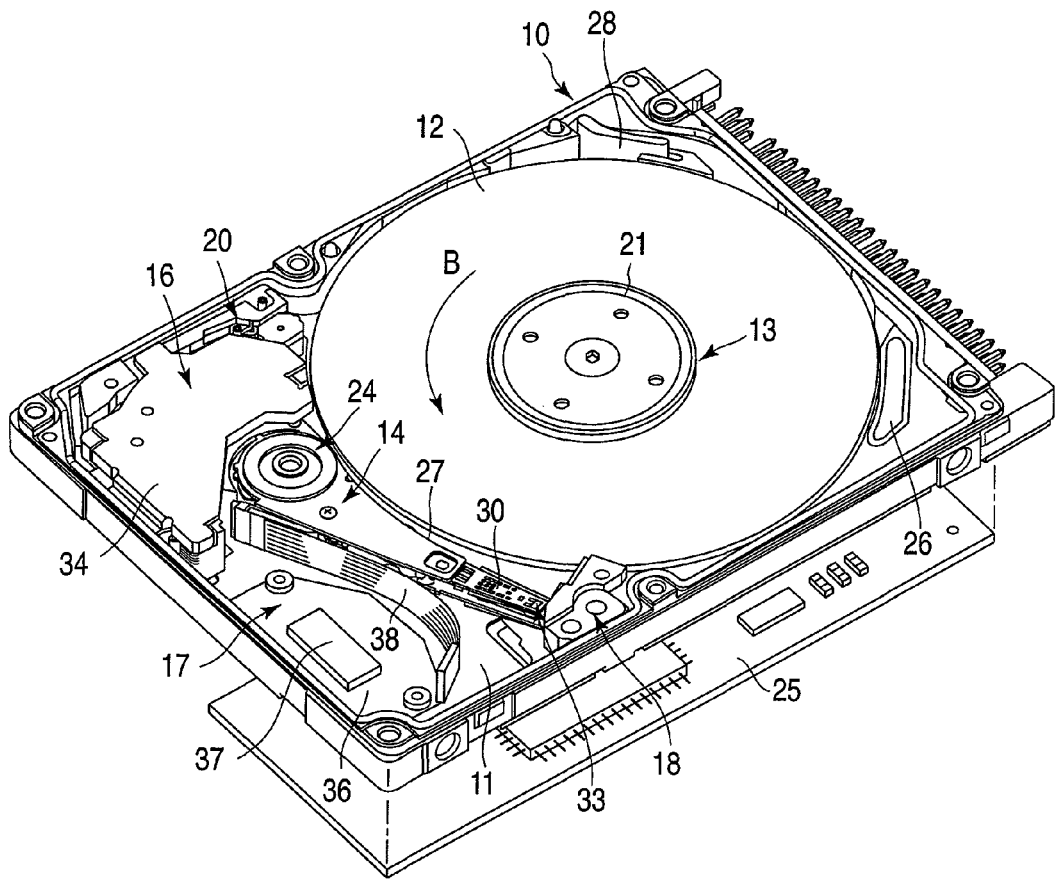
F I G. 1
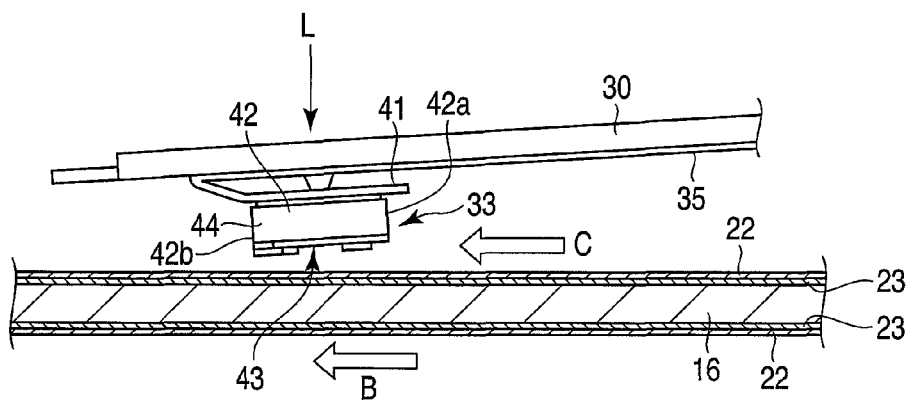
F I G. 2

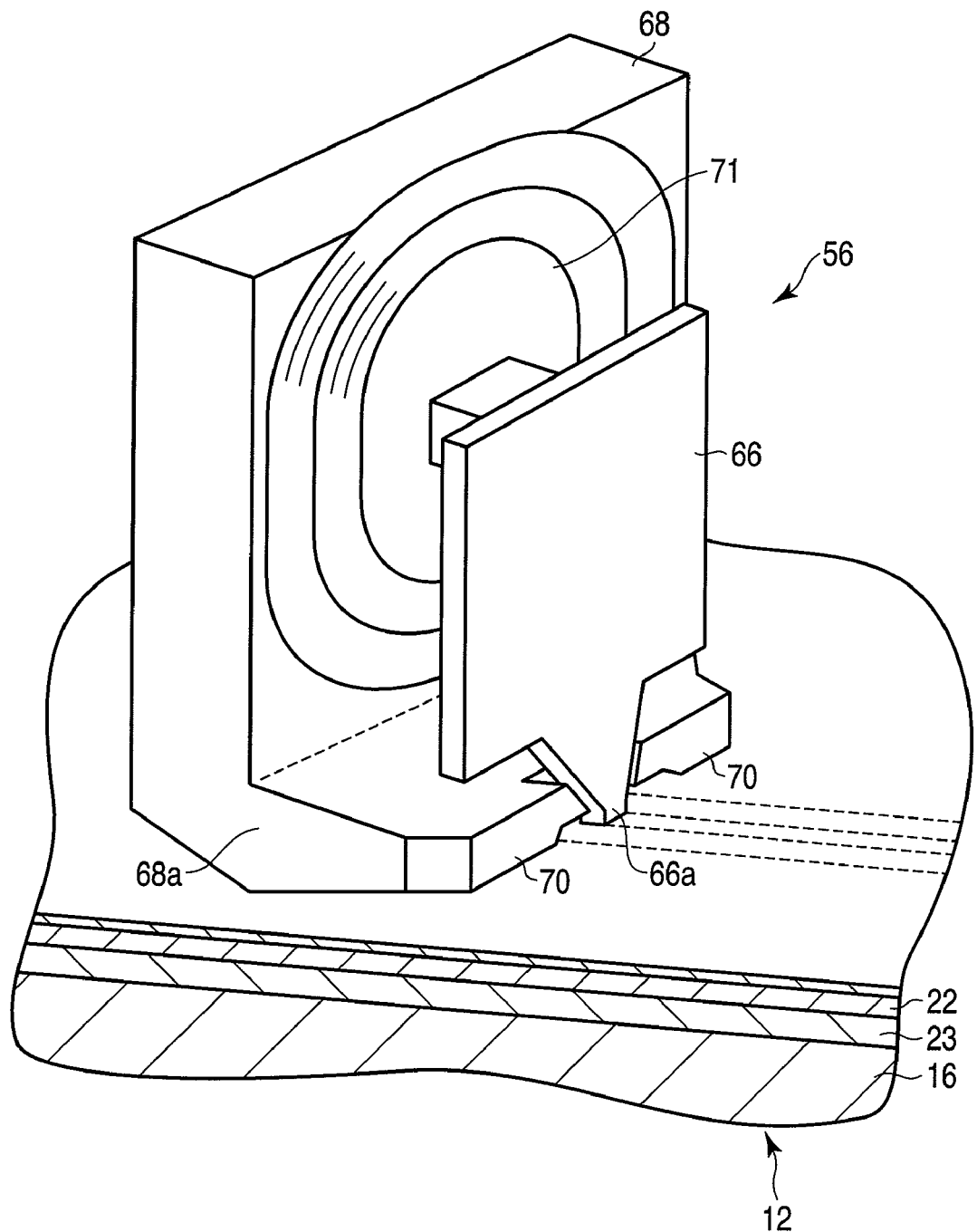
F I G. 10

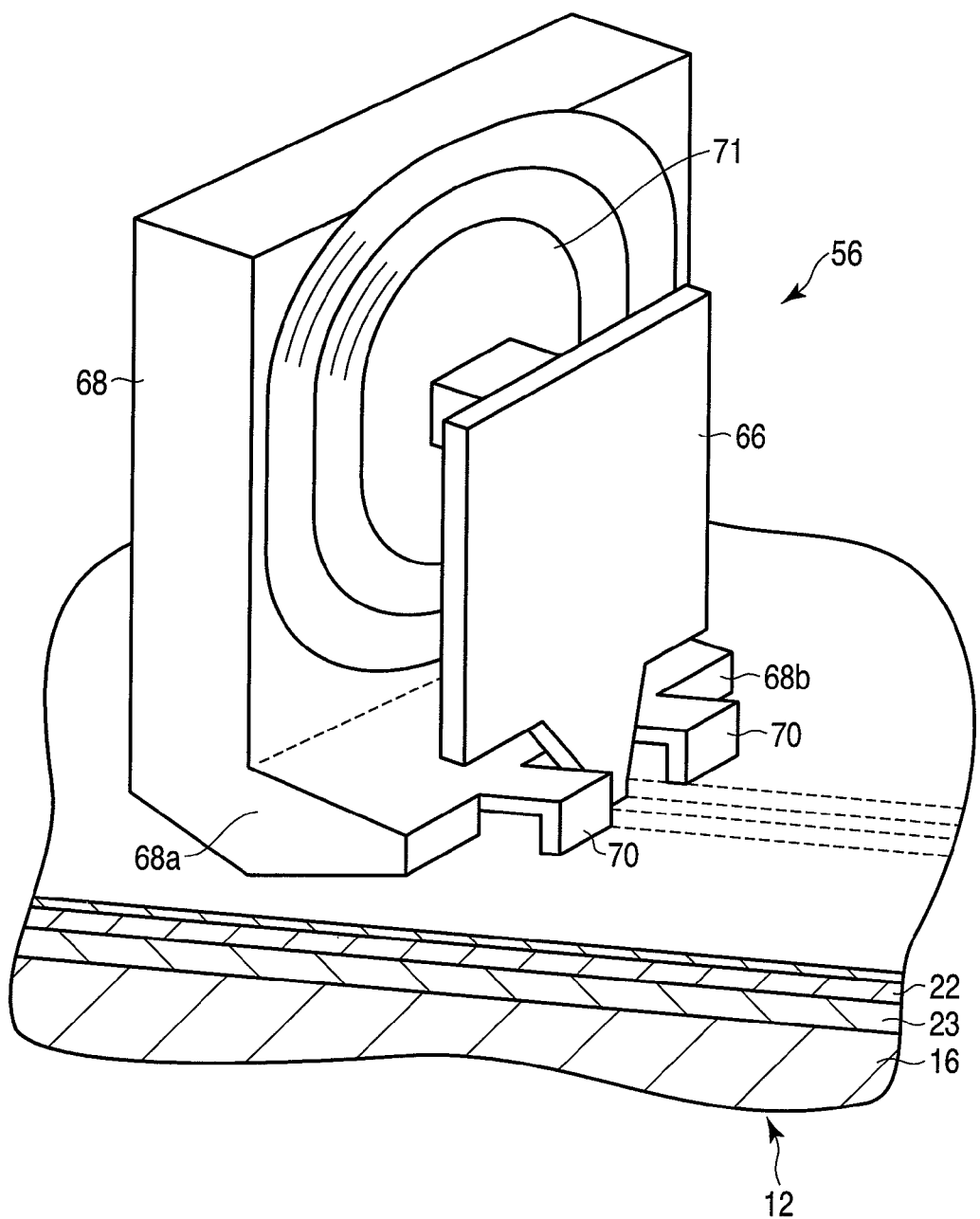
F I G. 13

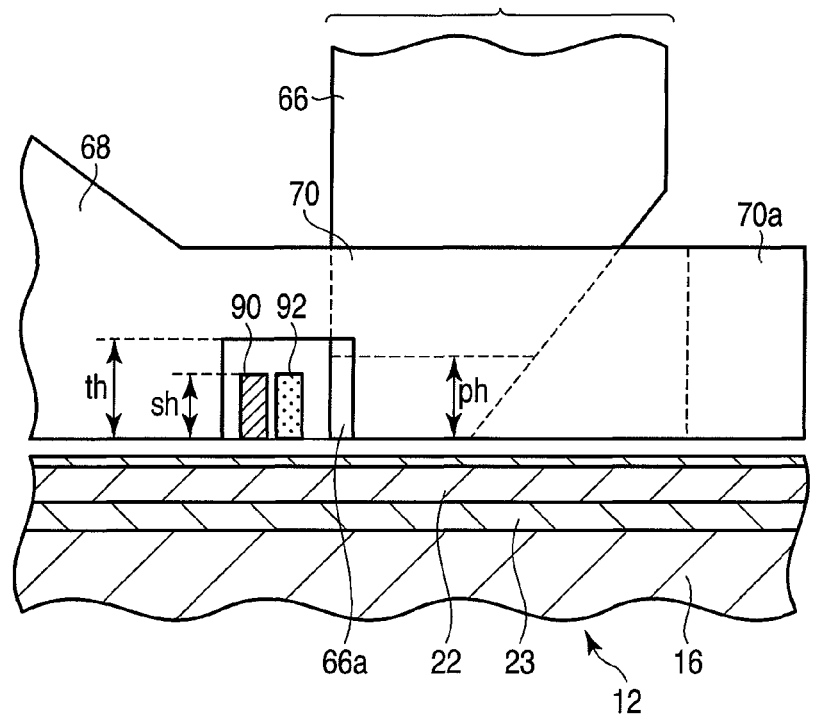
F I G. 16
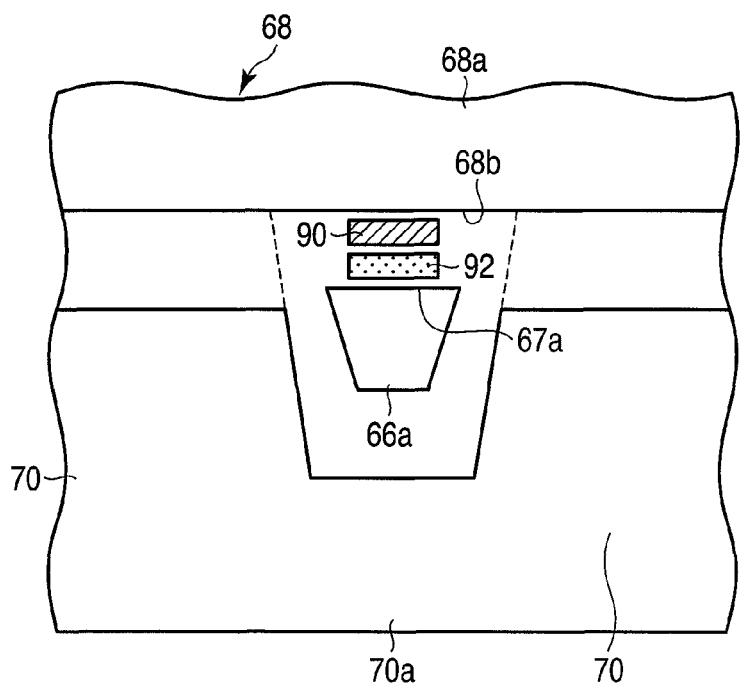
F I G. 17

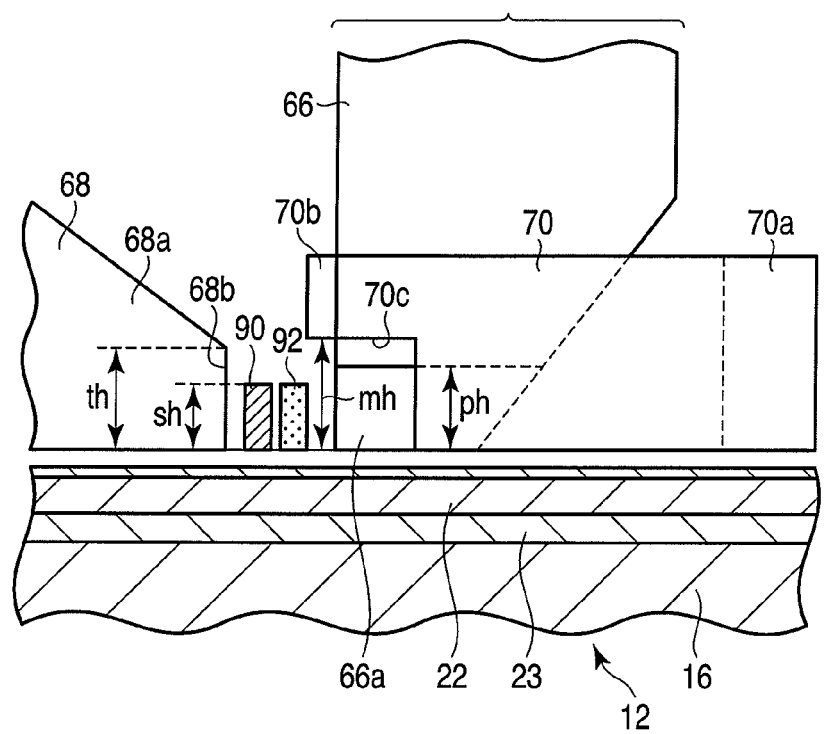
F I G. 18
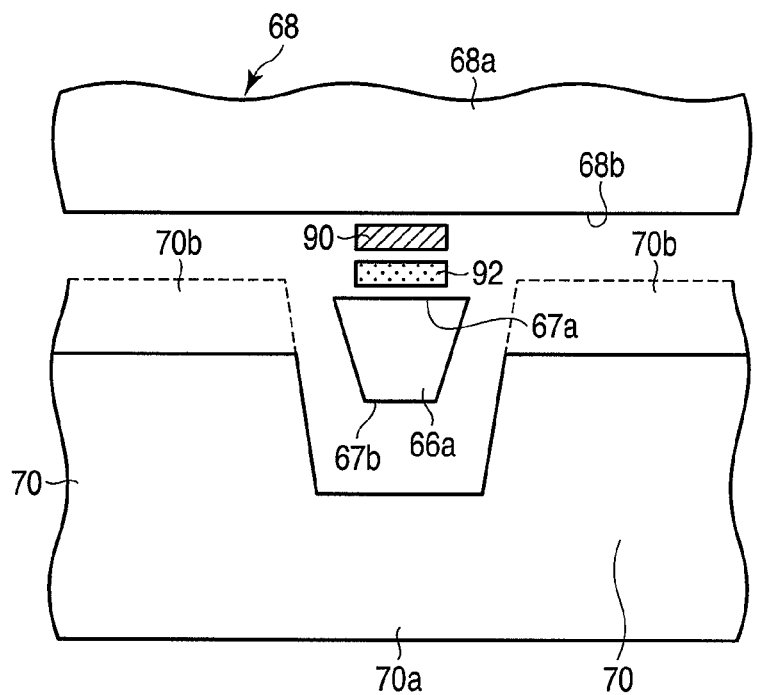
F I G. 19

MAGNETIC HEAD FOR PERPENDICULAR RECORDING AND DISK DRIVE WITH THE SAME

CROSS-REFERENCE TO RELATED APPLICATIONS

This application is based upon and claims the benefit of priority from Japanese Patent Application No. 2009-272776 filed Nov. 30, 2009; the entire contents of which are incorporated herein by reference.

FIELD

Embodiments described herein relate generally to a magnetic head for perpendicular magnetic recording used in a disk drive and the disk drive provided with the magnetic head.

BACKGROUND

A disk drive, such as a magnetic disk drive, comprises a magnetic disk, spindle motor, magnetic head, and carriage assembly. The magnetic disk is disposed in a case. The spindle motor supports and rotates the disk. The magnetic head reads and writes information from and to the disk. The carriage assembly supports the head for movement relative to the disk. The carriage assembly comprises a pivotably supported arm and a suspension extending from the arm, and a magnetic head is supported on an extended end of the suspension. The magnetic head comprises a slider mounted on the suspension and a head section disposed on the slider. The head section comprises a recording head for writing and a reproducing head for reading.

In recent years, a magnetic head for perpendicular magnetic recording has been proposed to increase the recording density and capacity or reduce the size of a magnetic disk drive. In the magnetic head of this type, a recording head comprises a main pole, return pole or write/shield pole, and coil. The main pole produces a perpendicular magnetic field. The return pole is located on the trailing side of the main pole with a write gap therebetween and closes a magnetic path between itself and a magnetic disk. The coil serves to pass magnetic flux through the main pole.

In recording a magnetic pattern along tracks of the magnetic disk, recording magnetic fields also leak out from the opposite sides of the machining pole transversely relative to the tracks. In order to reduce the leakage fields, a head is provided that comprises side shields on the opposite sides of the main pole transversely relative to the tracks. In order to enhance the recording density, moreover, a magnetic head of a radio-frequency-field-assisted recording type is proposed in which a spin-torque oscillator is provided between the main and return poles (e.g., Jpn. Pat. Appln. KOKAI Publications Nos. 2009-4089 and 2007-294059). In this head, the spin-torque oscillator applies a high-frequency magnetic head to a magnetic recording head.

If the shields are arranged individually on the opposite sides of the spin-torque oscillator in the magnetic head constructed in this manner, however, a magnetic field that flows into the oscillator is skewed in the vicinity of the film surface and transverse edges of the oscillator, thus failing to flow at right angles to the entire film surface. Consequently, the oscillation of the spin-torque oscillator is reduced, so that it is difficult to produce a desired high-frequency magnetic field.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing an HDD according to a first embodiment;

FIG. 2 is an exemplary side view showing a magnetic head and a suspension in the HDD;

FIG. 10 is an exemplary perspective view typically showing a recording head of a magnetic head in an HDD according to a second embodiment;

FIG. 13 is an exemplary perspective view typically showing a recording head of a magnetic head in an HDD according to a third embodiment;

FIG. 16 is an exemplary enlarged side view showing a recording head of a magnetic head in an HDD according to a fourth embodiment;

FIG. 17 is an exemplary plan view of the recording head taken from the ABS side;

FIG. 18 is an exemplary enlarged side view showing a recording head of a magnetic head in an HDD according to a fifth embodiment; and FIG. 19 is an exemplary plan view of the recording head taken from the ABS side.

DETAILED DESCRIPTION

Figure 3:
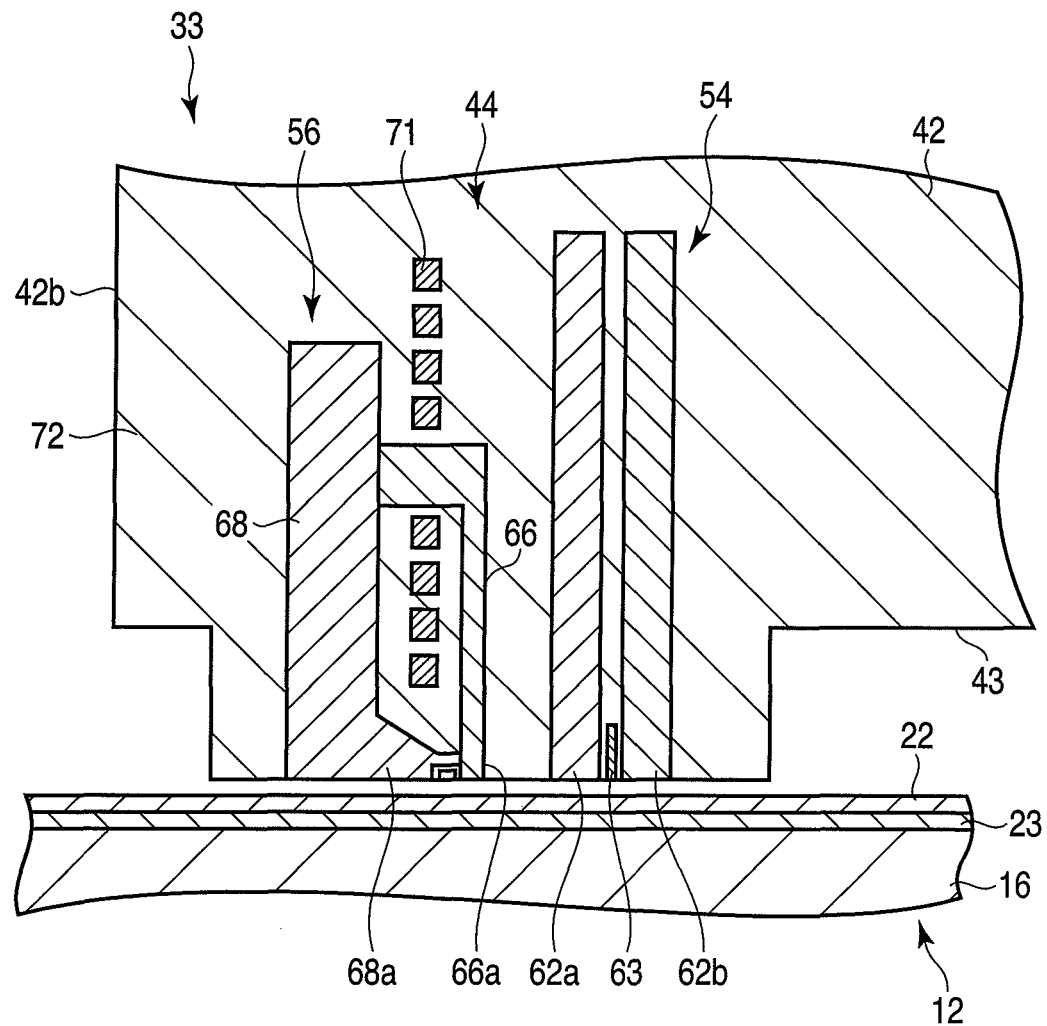
FIG. 3 is an exemplary enlarged sectional view showing a head section of the magnetic head.

Various embodiments will be described hereinafter with reference to the accompanying drawings.

In general, according to one embodiment, a magnetic head for perpendicular recording, comprises: a main pole comprising a tip portion facing the recording medium and configured to produce a recording magnetic field; a return pole opposed to a trailing side of the main pole across a write gap and configured to return magnetic flux from the main pole to form a magnetic circuit in conjunction with the main pole; a coil configured to excite the magnetic flux in the magnetic circuit formed of the main pole and the return pole; a spin-torque oscillator between the main pole and a surface of the return pole opposed thereto, configured to produce a high-frequency magnetic field; and side shields individually on opposite sides of the main pole transversely relative to a track, magnetically separated from the main pole, and located at a height position above the recording medium higher than that of the spin-torque oscillator.

A first embodiment in which a disk drive is applied to a hard disk drive (HDD) will now be described in detail with reference to the accompanying drawings.

FIG. 1 shows the internal structure of the HDD with its top cover off, and FIG. 2 shows a flying magnetic head. As shown in FIG. 1, the HDD comprises a case 10. The case 10 comprises a base 11 in the form of an open-topped rectangular box and a top cover (not shown) in the form of a rectangular plate. The top cover is attached to the base by screws so as to close the top opening of the base. Thus, the case 10 is kept airtight inside and can open to the outside through a breather filter 26 only. The base 11 and top cover are formed of a metallic material, such as aluminum, iron, stainless steel, or cold-rolled carbon steel.

A magnetic disk 12 for use as a recording medium and a mechanical unit are arranged on the base 11. The mechanical unit comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record and reproduce information in and from the disk. The head actuator 14 supports the heads 33 for movement relative to the surfaces of the disk 12. The VCM 16 pivots and positions the head actuator. A ramp load mechanism 18, inertial latch mechanism 20, and board unit 17 are also arranged on the base 11. The ramp load mechanism 18 holds the magnetic heads 33 in positions off the magnetic disk 12 when the heads 33 are moved to the outermost periphery of the disk 12. The inertial latch mechanism 20 holds the head actuator 14 in a retracted position if the HDD is jolted, for example. Electronic components, such as a preamplifier, head IC, etc., are mounted on the board unit 17.

A control circuit board 25 is attached to the outer surface of the base 11 by screws and opposed to a bottom wall of the base 11. The control circuit board 25 controls the operations of the spindle motor 13, VCM 16, and magnetic heads 33 through the board unit 17.

As shown in FIGS. 1 and 2, the magnetic disk 12 is constructed as a double-layered perpendicular recording medium. The disk 12 has a diameter of about 2.5 inches and comprises a substrate 16 of a nonmagnetic material. A soft magnetic underlayer 23 and perpendicular magnetic recording layer 22 are sequentially formed on each surface of the substrate 16, and in addition, a protective film (not shown) is formed on the recording layer 22. The recording layer 22 has magnetic anisotropy perpendicular to the disk surfaces.

As shown in FIG. 1, the magnetic disk 12 is coaxially fitted on a hub of the spindle motor 13 and clamped and fixed to the hub by a clamp spring 21, which is attached to the upper end of the hub by screws. The disk 12 is rotated at a predetermined speed in the direction of arrow B by the spindle motor 13 for use as a drive motor.

The head actuator 14 comprises a bearing 24 fixed on the bottom wall of the base 11 and a plurality of arms 27 extending from the bearing 24. The arms 27 are located parallel to the surfaces of the magnetic disk 12 and at predetermined intervals and extend in the same direction from the bearing 24. The head actuator 14 comprises elastically deformable suspensions 30 each in the form of an elongated plate. Each suspension 30 is formed of a plate spring, of which the proximal end is fixed to the distal end of its corresponding arm 27 by spot welding or adhesive bonding, and which extends from the arm. Alternatively, each suspension 30 may be formed integrally with its corresponding arm 27. A magnetic head 33 is supported on an extended end of each suspension 30. Each arm 27 and suspension 30 constitute a head suspension, and the head suspension and each magnetic head 33 constitute a head suspension assembly.

As shown in FIG. 2, each magnetic head 33 comprises a substantially cuboid slider 42 and read/write head section 44 on an outflow end (trailing end) of the slider. Each head 33 is fixed to a gimbal spring 41 on the distal end portion of each corresponding suspension 30. A head load L directed to the surface of the magnetic disk 12 is applied to each head 33 by the elasticity of the suspension 30. The two arms 27 are located parallel to each other with a predetermined space therebetween, and the suspensions 30 and magnetic heads 33 mounted on these arms face one another with the magnetic disk 12 between them.

Each magnetic head 33 is electrically connected to a main FPC 38 (described later) through a relay flexible printed circuit board (relay FPC) 35 fixed to the suspension 30 and arm 27.

As shown in FIG. 1, the board unit 17 comprises an FPC body 36, formed of a flexible printed circuit board, and the main FPC 38 extending from the FPC body. The FPC body 36 is fixed on the bottom surface of the base 11. Electronic components, such as a preamplifier, head IC, etc., are mounted on the FPC body 36. An extended end of the main FPC 38 is connected to the head actuator 14 and also to each magnetic head 33 through each relay FPC 35.

The VCM 16 comprises a support frame (not shown) extending from the bearing 24 and a voice coil supported on the frame. When the head actuator 14 is incorporated in the base 11, the voice coil is located between a pair of yokes 34 that are fixed on the base 11. Thus, the voice coil, along with the yokes and a magnet fixed to the yokes, constitutes the VCM 16.

If the voice coil of the VCM 16 is energized with the magnetic disk 12 in rotation, the head actuator 14 pivots so that each magnetic head 33 is moved to and positioned on a desired track of the disk 12. When this is done, the head 33 is moved radially relative to the disk 12 between the inner and outer peripheral edge portions of the disk.

The following is a detailed description of a configuration of the magnetic head 33. FIG. 3 is an exemplary enlarged sectional view of the head section 44 of the head 33.

As shown in FIGS. 2 and 3, the magnetic head 33 is constructed as a flying head, which comprises the substantially cuboid slider 42 and head section 44 formed on the outflow-side (or trailing-side) end portion of the slider. The slider 42 is formed of, for example, a ceramic sintered compact of alumina and titanium carbide (AlTiC), and the head section 44 is formed by laminating thin films.

The slider 42 has a rectangular disk-facing surface or air-bearing surface (ABS) 43 that faces the surface of the magnetic disk 12. The slider 42 is caused to fly by airflow C that is produced between the disk surface and the ABS 43 as the disk 12 rotates. The direction of airflow C is coincident with the direction of rotation B of the disk 12. The slider 42 is located on the surface of the disk 12 in such a manner that the longitudinal direction of the ABS 43 is substantially coincident with the direction of airflow C.

The slider 42 comprises a leading end 42a on the inflow side of airflow C and a trailing end 42b on the outflow side. The ABS 43 of the slider 42 is formed with a leading step, trailing step, side steps, negative-pressure cavity, etc.

As shown in FIG. 3, the head section 44 comprises a reproducing head 54 and recording head 56 formed on the trailing end 42b of the slider 42 by a thin-film process, and is formed as a separate-type magnetic head.

The reproducing head 54 comprises a magnetic film 63 with a magnetoresistive effect and shielding films 62a and 62b arranged on the trailing and leading sides, respectively, of the magnetic film so that the magnetic film is sandwiched between them. The respective lower ends of the magnetic film 63 and shielding films 62a and 62b are exposed on the ABS 43 of the slider 42.

The recording head 56 is disposed on the trailing end side of the slider 42 with respect to the reproducing head 54. The recording head 56 is constructed as a single-pole head having its return pole on the trailing end side.

Figure 4:
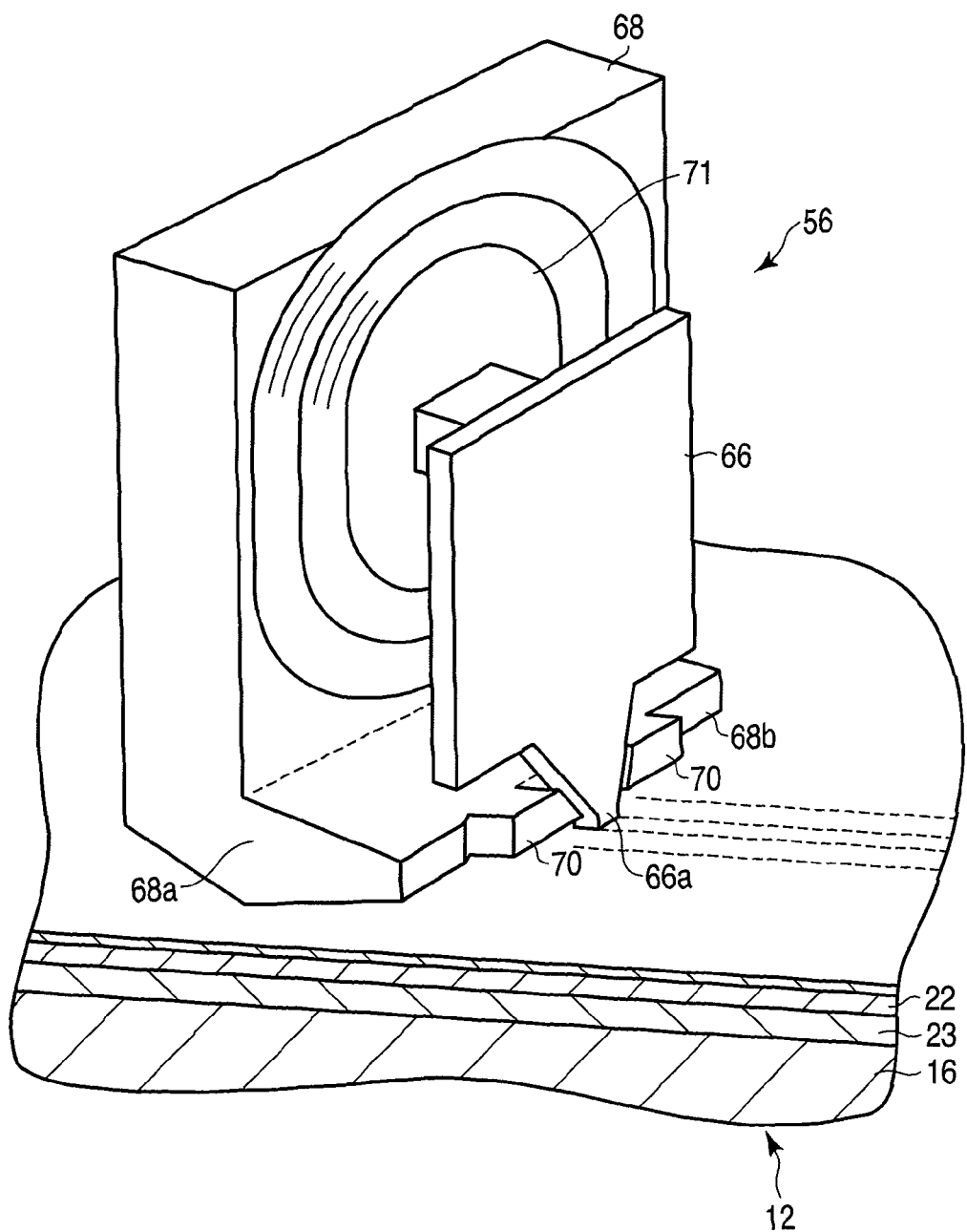
FIG. 4 is an exemplary perspective view typically showing a recording head of the magnetic head.
Figure 5:
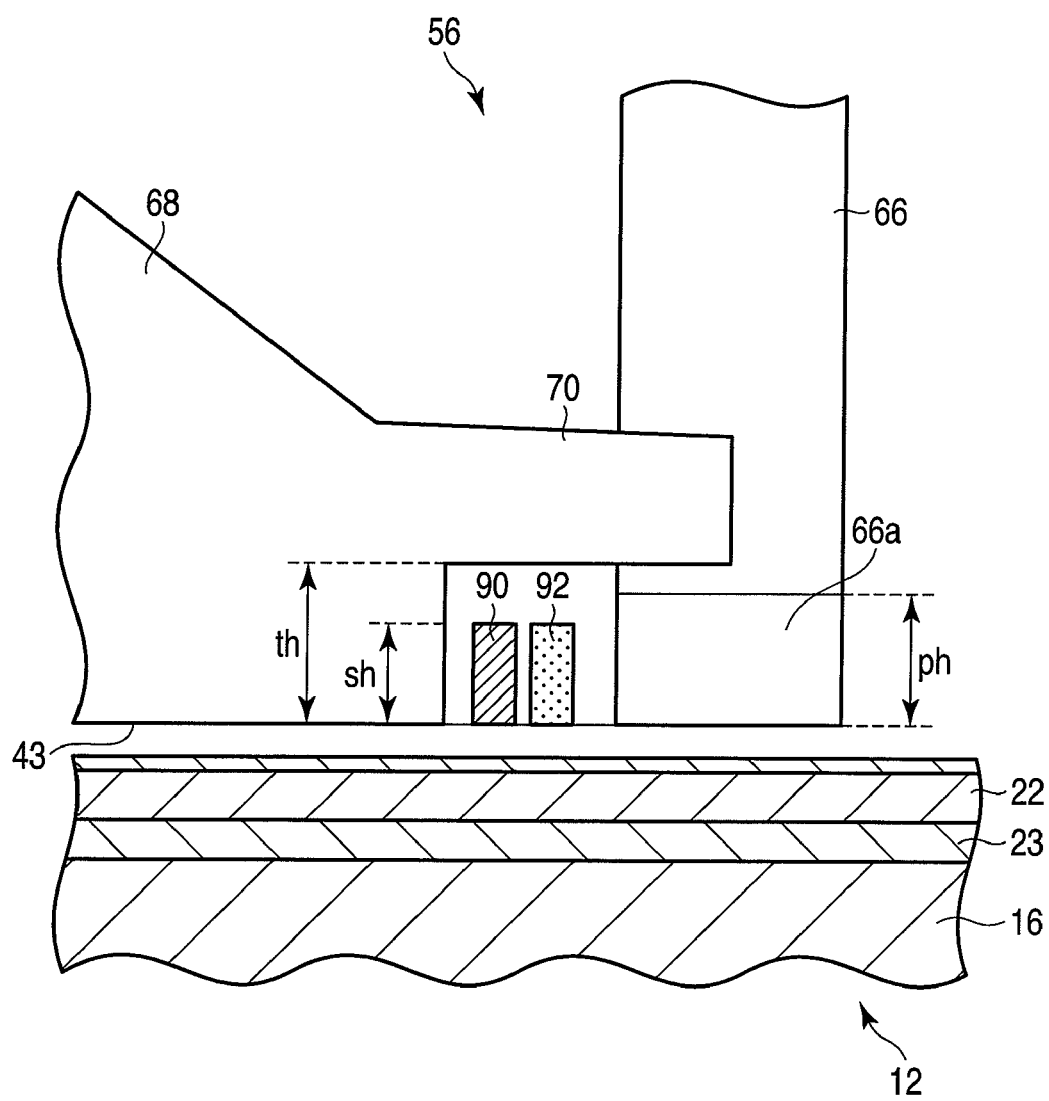
FIG. 5 is an exemplary enlarged side view showing a disk-side end portion of the recording head.
Figure 6:
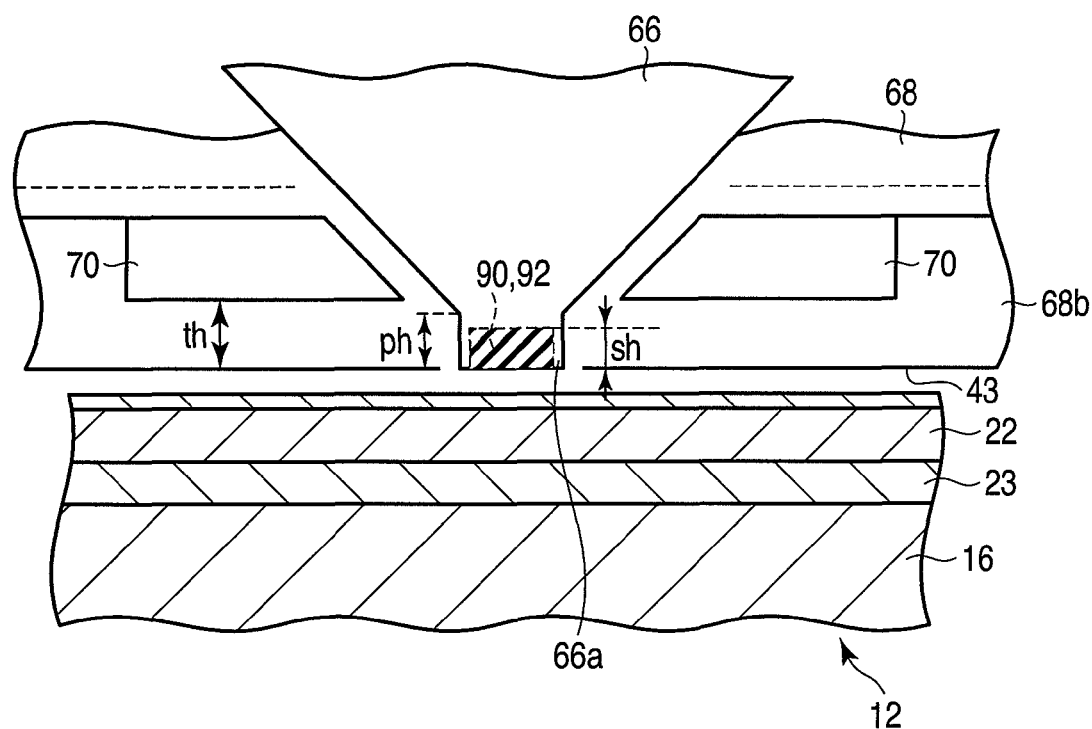
FIG. 6 is an exemplary front view of the disk-side end portion of the recording head taken from the main-pole side.
Figure 7:
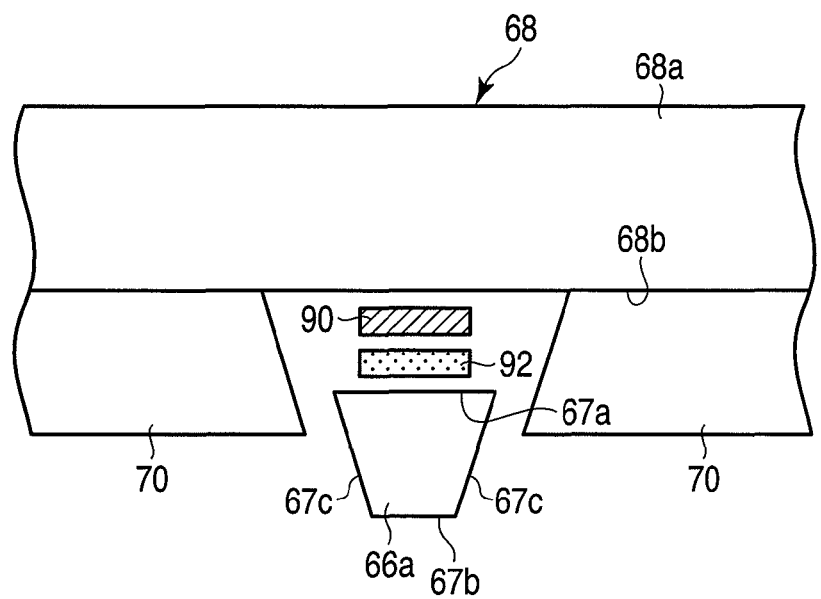
FIG. 7 is an exemplary plan view of a recording head part taken from the ABS side of a slider.

FIG. 4 is an exemplary perspective view typically showing the recording head 56 and magnetic disk 12, FIG. 5 is an exemplary enlarged side view showing a disk-side end portion of the recording head, FIG. 6 is an exemplary front view of the disk-side end portion of the recording head taken from the main-pole side, and FIG. 7 is an exemplary plan view of a recording head part taken from the ABS side of the slider.

As shown in FIGS. 3 and 4, the recording head 56 comprises a main pole 66, return pole (write/shield pole) 68, and recording coil 71. The main pole 66 is formed of a high-permeability material that produces a recording magnetic field perpendicular to the surfaces of the magnetic disk 12. The return pole 68 is located on the trailing side of the main pole 66 and configured to efficiently close a magnetic path through the soft magnetic underlayer 23 immediately below the main pole. The recording coil 71 is located so as to wind around the magnetic path including the main pole 66 and return shield pole 68 in order to pass magnetic flux through the main pole.

As shown in FIGS. 4 to 7, the main pole 66 extends substantially at right angles to the surfaces of the magnetic disk 12. A tip portion 66a of the main pole 66 on the side of the magnetic disk 12 is tapered toward the disk surface. As shown in FIG. 7, the tip portion 66a of the main pole 66 has, for example, a trapezoidal cross section and comprises a trailing end face 67a, leading end face 67b, and opposite side faces 67c. The trailing end face 67a is located on the trailing end side and has a predetermined width. The leading end face 67b is located opposite the trailing end face and is narrower than the trailing end face. The tip end face of the main pole 66 is exposed on the ABS 43 of the slider 42. The width of the trailing end face 67a is substantially equal to the track width of the magnetic disk 12.

As shown in FIGS. 4 to 7, the return pole 68 is substantially L-shaped and its tip portion 68a has an elongated rectangular shape. The tip end face of the return pole 68 is exposed on the ABS 43 of the slider 42. A leading end face 68b of the tip portion 68a extends transversely relative to the tracks of the magnetic disk 12. The leading end face 68b is opposed to the trailing end face 67a of the main pole 66 in a parallel manner with a write gap WG therebetween.

As shown in FIGS. 5 to 7, the recording head 56 comprises a spin-torque oscillator 90 disposed between the tip portion 66a of the main pole 66 and a surface of the return pole 68 opposed thereto. The oscillator 90 is located between and parallel to the trailing end face 67a of the tip portion 66a of the main pole 66 and the leading end face 68b of the return pole 68. The spin-torque oscillator 90 has its tip end exposed on the ABS 43 and is flush with the tip end face of the main pole 66 relative to the surface of the magnetic disk 12. The oscillator 90 applies a high-frequency magnetic field to the disk 12 under the control of the control circuit board 25.

The spin-torque oscillator 90 comprises, for example, an electrode film, intermediate layer with high spin transmittance, oscillator layer, bias layer, and electrode layer, which are laminated from the return-pole side to the main-pole side in the order named. To facilitate oscillation of the spin-torque oscillator 90, moreover, a spin injection layer 92 is provided on the main-pole side of the oscillator. Preferably, the length of the trailing end face 67a of the tip portion 66a of the main pole 66 transversely relative to the tracks is greater than that of the spin-torque oscillator 90. A height ph of the tip portion 66a above the ABS 43 is greater than a height sh of the oscillator 90.

As shown in FIGS. 5 to 7, the recording head 56 comprises a pair of side shields 70 disposed individually on the longitudinally opposite sides of the write gap of the main pole 66, that is, on the opposite sides of the main pole transversely relative to the tracks. On the ABS 43, the side shields 70 are magnetically isolated from the main pole 66. In the present embodiment, the side shields 70 are formed integrally with the tip portion 68a of the return pole 68 from a highly permeable material and extend from the leading end face 68b of the tip portion 68a toward the leading end side of the slider 42.

Each side shield 70 extends from the leading end face 68b of the return pole 68 and at least partially faces the vicinity of the tip portion 66a of the main pole 66 across a gap narrower than the write gap. The height position of each side shield 70 above the magnetic disk 12, that is, above the ABS 43 in this case, is higher than that of the spin-torque oscillator 90. Specifically, a height th of each side shield 70 above the ABS 43 is greater than height sh of the oscillator 90 above the ABS 43, and the side shields 70 are not located on the opposite sides of the oscillator 90 transversely relative to the tracks. Each side shield 70 is disposed at a height greater than height ph of the tip portion 66a of the main pole 66 above the ABS 43.

As shown in FIG. 3, a protective insulating film 72 covers the entire reproducing head 54 and recording head 56 except those parts which are exposed on the ABS 43 of the slider 42. The insulating film 72 defines a contour of the head section 44.

If the VCM 16 is energized, according to the HDD constructed in this manner, the head actuator 14 pivots, whereupon each magnetic head 33 is moved to and positioned on a desired track of the magnetic disk 12. Further, the magnetic head 33 is caused to fly by airflow C that is produced between the disk surface and the ABS 43 as the disk 12 rotates. When the HDD is operating, the ABS 43 of the slider 42 is opposed to the disk surface across a gap. As shown in FIG. 2, the head 33 flies in such an inclined posture that the recording head 56 of the head section 44 is located closest to the disk surface. In this state, recorded information is read from the magnetic disk 12 by the reproducing head 54, while information is written by the recording head 56.

In the writing operation, the spin-torque oscillator 90 is supplied with a DC current to produce a high-frequency magnetic field, which is applied to the perpendicular magnetic recording layer 22 of the magnetic disk 12. Further, the main pole 66 is excited by the recording coil 71 to apply a recording magnetic field perpendicular to the recording layer 22 of the magnetic disk 12 immediately below the main pole, whereupon information is recorded with a desired track width. Magnetic recording can be performed with high retention and high magnetic anisotropic energy by superposing the high-frequency magnetic field on the recording magnetic field.

In doing this, the side shields 70 are disposed individually on the opposite sides of the main pole 66 and opposed to the main pole across gaps narrower than the write gap. Therefore, magnetic flux can be prevented from leaking from the tip portion 66a of the main pole 66 to adjacent tracks without reducing the quality of signals written to a write track. Thus, degradation of information recorded in the adjacent tracks can be prevented.

Further, the side shields 70 are located higher than the spin-torque oscillator 90, so that the magnetic field that flows into the spin-torque oscillator can be prevented from being skewed by the side shields. Accordingly, lines of magnetic flux produced from a magnetic circuit that is interposed between the tip portion 66a of the main pole 66 and the return pole 68 flow at right angles to the entire film surface of the spin-torque oscillator 90, so that the oscillation properties of the oscillator 90 are satisfactory.

Thus, erasure of the adjacent tracks can be prevented without reducing the capacity of recording on the write track, so that the track density of the recording layer of the magnetic disk 12 can be increased, and the recording density of the HDD can be enhanced.

The inventors hereof prepared the magnetic head 33 according to the present embodiment and magnetic heads according to Comparative Examples 1 and 2, and compared their bit error rates obtained when recording and reproduction were performed by means of these heads. Comparative Example 1 is a magnetic head that comprises a spin-torque oscillator and does not comprise side shields. Comparative Example 2 is a magnetic head that comprises a spin-torque oscillator and side shields arranged individually on the opposite sides of the oscillator transversely relative to tracks.

Figure 8:
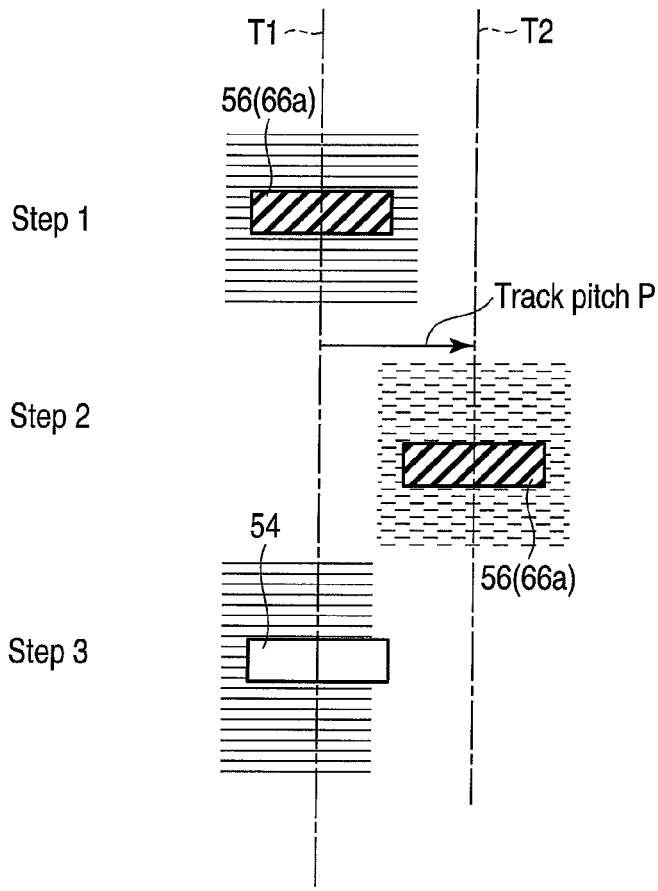
FIG. 8 is an exemplary diagram showing a method for simultaneously evaluating bit error rates for directions transversely and linearly relative to the tracks of each magnetic head.
Figure 9:
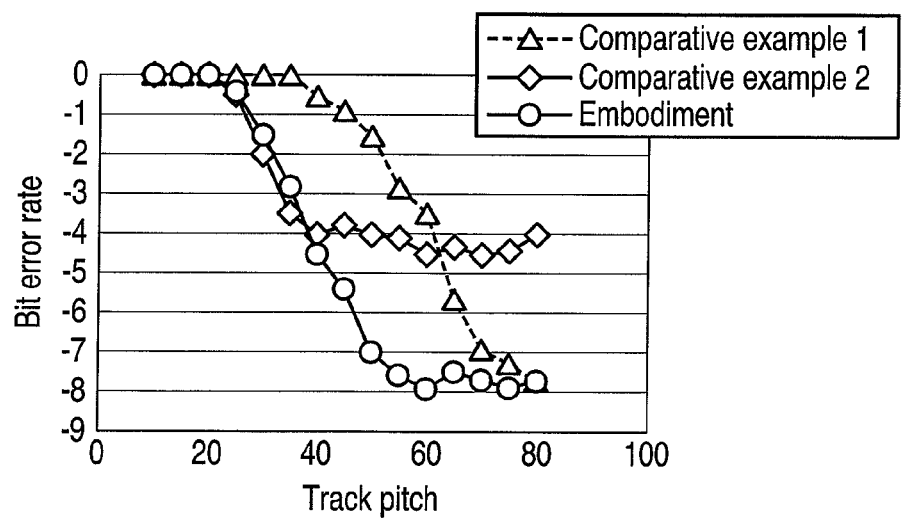
FIG. 9 is an exemplary diagram showing evaluation results on magnetic heads according to comparative examples and the present embodiment.

FIG. 8 shows a method for simultaneously evaluating bit error rates for directions transversely and linearly relative to the tracks of each magnetic head, and FIG. 9 shows evaluation results on the magnetic heads. As shown in FIG. 8, the evaluation method is carried out in three steps. In Step 1, a random signal is recorded in the position of a certain track T1 on the magnetic disk by the recording head. In Step 2, the magnetic head is shifted for a track pitch P from the position of the first track T1 as signal recording is performed. In Step 3, the reproducing head 54 is located in the position of the first recording track T1 and a recorded signal is read. Steps 1 to 3 are repeated with the track pitch P of Step 2 changed sequentially, and the state of survival of the first recorded random signal is measured. By doing this, the states of erasure of adjacent tracks that depend on the level of transverse leakage of magnetic flux relative to the tracks can be detected and compared.

In the magnetic head according to Comparative Example 1, as shown in FIG. 9, the transverse leakage of magnetic flux relative to the tracks is so great that the track pitch P obtained before the bit error rate is improved is inevitably large. Therefore, the track density cannot be enhanced. In the magnetic head according to Comparative Example 2, the track pitch for the saturation of the bit error rate is small because of the presence of the side shields on the opposite sides of the spin-torque oscillator. Since the oscillation of the oscillator is not satisfactory, however, the value of the bit error rate is poor, and the linear density cannot be improved.

In the magnetic head according to the present embodiment, the oscillation of the spin-torque oscillator is satisfactory, so that the bit error rate is improved, and transverse leakage of magnetic flux relative to the tracks can be suppressed. Thus, the track pitch P obtained before the bit error rate is improved is small, and the track density is improved.

The following is a description of magnetic heads of HDDs according to alternative embodiments.

The magnetic heads of the following alternative embodiments are different from that of the first embodiment mainly in the configuration of side shields, and the other configurations are the same. Therefore, like reference numbers are used to designate like parts in these embodiments, and a detailed description of those parts is omitted.

Figure 11:
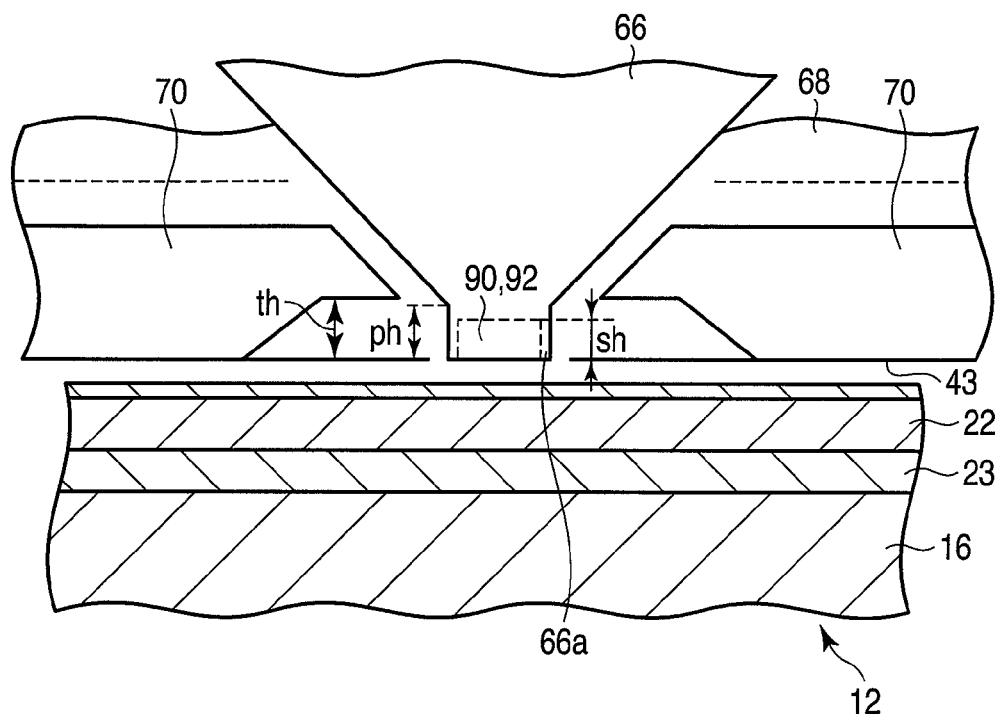
FIG. 11 is an exemplary enlarged front view showing a disk-side portion of the recording head of the second embodiment.
Figure 12:
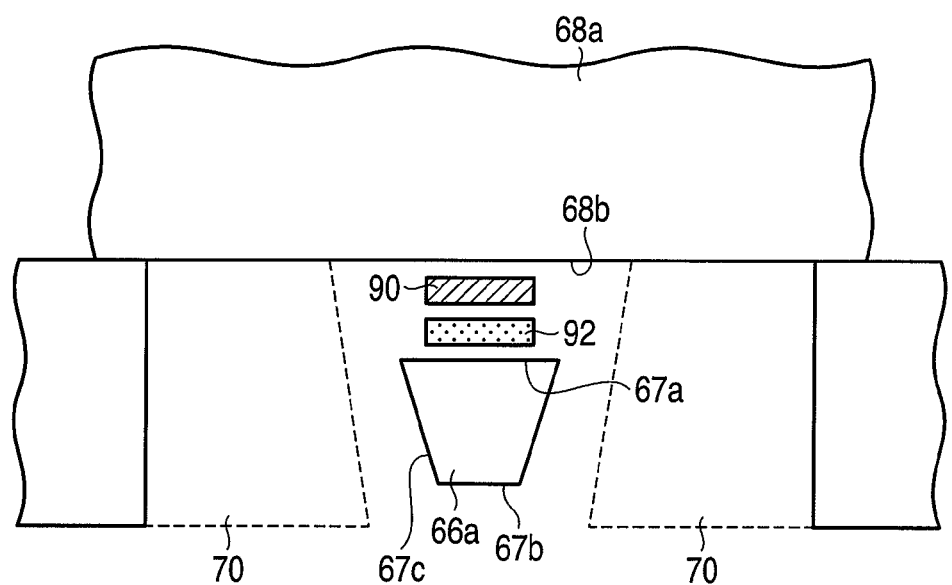
FIG. 12 is an exemplary plan view of the recording head taken from the ABS side.

FIG. 10 is an exemplary perspective view typically showing a recording head 56 of a magnetic head in an HDD according to a second embodiment, FIG. 11 is an exemplary enlarged front view showing a disk-side portion of the recording head, and FIG. 12 is an exemplary plan view of the recording head taken from the ABS side.

According to the second embodiment, a pair of side shields 70 disposed individually on the opposite sides of a tip portion 66a of a main pole 66 transversely relative to the tracks are formed integrally with a return pole 68 and protrude from a leading end face 68b of the return pole. On an ABS, the side shields 70 are magnetically isolated from the main pole 66. Each side shield 70 at least partially faces the vicinity of the tip portion 66a of the main pole 66 across a gap narrower than a write gap.

The side shields 70 are disposed at a height position higher than that of a spin-torque oscillator 90, on the opposite sides of the tip portion 66a of the main pole 66 transversely relative to the tracks. Specifically, a height th of each side shield 70 above an ABS 43 is greater than a height sh of the oscillator 90 above the ABS 43, immediately on the opposite sides of the oscillator 90 transversely relative to the tracks. In the present embodiment, each side shield 70 reaches the ABS 43 in a region sufficiently separated from the main pole 66 transversely relative to the tracks. Further, each side shield 70 projects beyond a leading end face 67b of the tip portion 66a of the main pole 66 from the return pole 68 toward the leading side.

According to the magnetic head constructed in this manner, lines of magnetic flux produced from a magnetic circuit that is interposed between the tip portion 66a of the main pole 66 and the return pole 68 flow at right angles to the entire film surface of the spin-torque oscillator 90, so that the oscillation properties of the oscillator 90 are satisfactory. Further, leakage of magnetic flux from the tip portion 66a of the main pole 66 to adjacent tracks can be suppressed by the side shields 70, so that degradation of information recorded in the adjacent tracks can be prevented.

Figure 14:
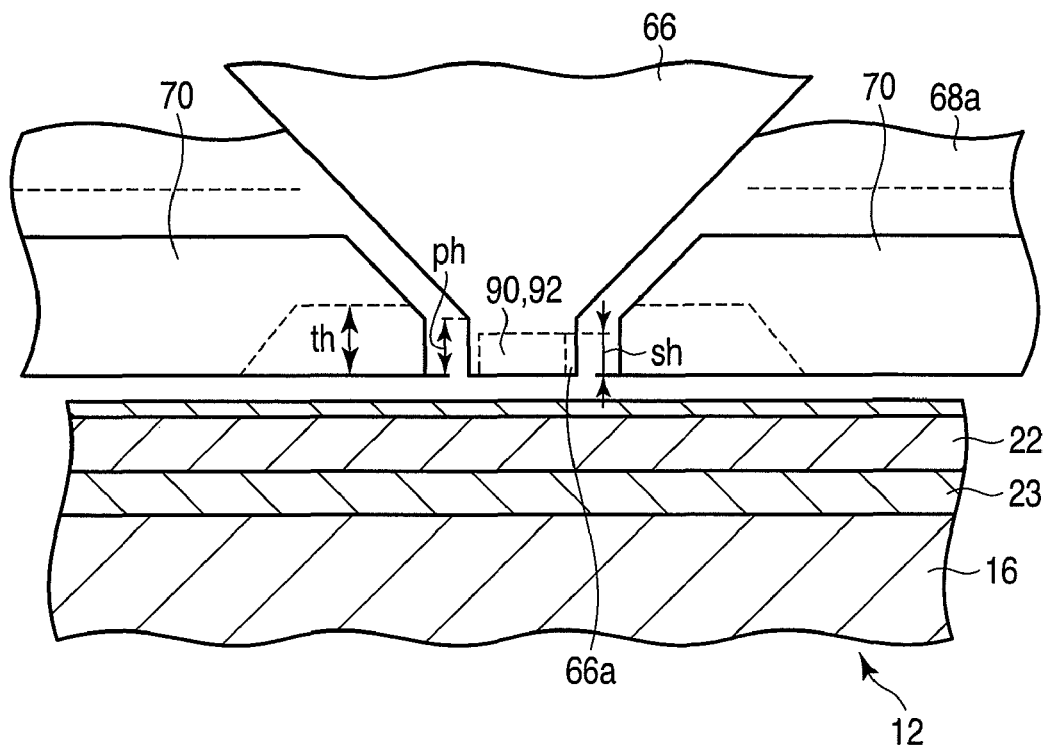
FIG. 14 is an exemplary enlarged front view showing a disk-side portion of the recording head of the third embodiment.
Figure 15:
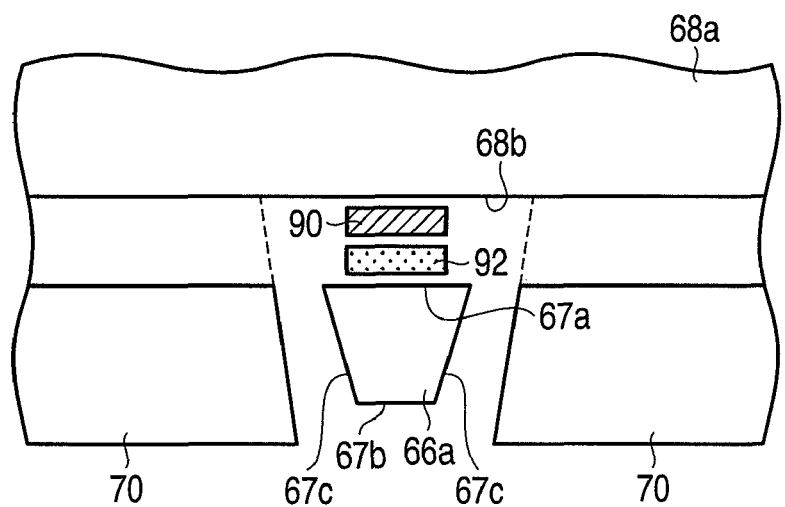
FIG. 15 is an exemplary plan view of the recording head taken from the ABS side.

FIG. 13 is an exemplary perspective view typically showing a recording head 56 of a magnetic head in an HDD according to a third embodiment, FIG. 14 is an exemplary enlarged front view showing a disk-side portion of the recording head, and FIG. 15 is an exemplary plan view of the recording head taken from the ABS side.

According to the third embodiment, a pair of side shields 70 disposed individually on the opposite sides of a tip portion 66a of a main pole 66 transversely relative to the tracks are formed integrally with a return pole 68 and protrude from a leading end face 68b of the return pole. On an ABS, the side shields 70 are magnetically isolated from the main pole 66. Each side shield 70 at least partially faces the vicinity of the tip portion 66a of the main pole 66 across a gap narrower than a write gap.

The side shields 70 are disposed at a height position higher than that of a spin-torque oscillator 90, on the opposite sides of the tip portion 66a of the main pole 66 transversely relative to the tracks. Specifically, a height th of each side shield 70 above an ABS 43 is greater than a height sh of the oscillator 90 above the ABS 43, immediately on the opposite sides of the oscillator 90 transversely relative to the tracks. In the present embodiment, a leading end portion or projected end portion of each side shield 70 extends to the ABS 43. Further, the respective leading end portions of the side shields 70 project beyond a leading end face 67b of the tip portion 66a of the main pole 66 toward the leading side.

Also in the magnetic head constructed in this manner, lines of magnetic flux produced from a magnetic circuit that is interposed between the tip portion 66a of the main pole 66 and the return pole 68 flow at right angles to the entire film surface of the spin-torque oscillator 90, so that the oscillation properties of the oscillator 90 are satisfactory. Further, leakage of magnetic flux from the tip portion 66a of the main pole 66 to adjacent tracks can be suppressed by the side shields 70, so that degradation of information recorded in the adjacent tracks can be prevented.

FIG. 16 is an exemplary enlarged side view showing a recording head 56 of a magnetic head in an HDD according to a fourth embodiment, and FIG. 17 is an exemplary plan view of the recording head taken from the ABS side.

According to the fourth embodiment, a pair of side shields 70 disposed individually on the opposite sides of a tip portion 66a of a main pole 66 transversely relative to the tracks are formed integrally with a return pole 68 and protrude from a leading end face 68b of the return pole. On an ABS, the side shields 70 are magnetically isolated from the main pole 66. Each side shield 70 at least partially faces the vicinity of the tip portion 66a of the main pole 66 across a gap narrower than a write gap.

The side shields 70 are disposed at a height position higher than that of a spin-torque oscillator 90, on the opposite sides of the tip portion 66a of the main pole 66 transversely relative to the tracks. Specifically, a height th of each side shield 70 above an ABS 43 is greater than a height sh of the oscillator 90 above the ABS 43, immediately on the opposite sides of the oscillator 90 transversely relative to the tracks. In the present embodiment, a leading end portion or projected end portion of each side shield 70 extends to the ABS 43. Further, the respective leading end portions of the side shields 70 project beyond a leading end face 67b of the tip portion 66a of the main pole 66 toward the leading side and are connected to each other. A junction 70a for this connection is opposed to the leading end face 67b of the tip portion 66a of the main pole 66 across a predetermined gap. In the present embodiment, the tip portion 66a of the main pole 66 is constricted from the leading side to the trailing side and further tapered, as shown in FIG. 16.

Also in the magnetic head constructed in this manner, lines of magnetic flux produced from a magnetic circuit that is interposed between the tip portion 66a of the main pole 66 and the return pole 68 flow at right angles to the entire film surface of the spin-torque oscillator 90, so that the oscillation properties of the oscillator 90 are satisfactory. Further, leakage of magnetic flux from the tip portion 66a of the main pole 66 to adjacent tracks can be suppressed by the side shields 70, so that degradation of information recorded in the adjacent tracks can be prevented.

FIG. 18 is an exemplary enlarged side view showing a recording head 56 of a magnetic head in an HDD according to a fifth embodiment, and FIG. 19 is an exemplary plan view of the recording head taken from the ABS side.

According to the fifth embodiment, a pair of side shields 70 disposed individually on the opposite sides of a tip portion 66a of a main pole 66 transversely relative to the tracks are formed independently of a return pole 68, that is, magnetically separated from the return pole. On an ABS, the side shields 70 are magnetically isolated from the main pole 66. Each side shield 70 at least partially faces the vicinity of the tip portion 66a of the main pole 66 across a gap narrower than a write gap.

The respective leading end portions of the side shields 70 project beyond a leading end face 67b of the tip portion 66a of the main pole 66 toward the leading side and are connected to each other. A junction 70a for this connection is opposed to the leading end face 67b of the tip portion 66a of the main pole 66 across a predetermined gap. Each side shield 70 extends from the junction 70a toward the return pole 68 and its trailing end portion 70b extends beyond the tip portion 66a toward the trailing side. That part of the trailing end portion 70b which is located on the side of an ABS 43 is cut to form a recess 70c.

Thus, on the opposite sides of a spin-torque oscillator 90 transversely relative to the tracks, a height mh of the trailing end portion 70b above the ABS 43 is greater than a height sh of the oscillator 90, so that no side shields exist on the opposite sides of the spin-torque oscillator 90 transversely relative to the tracks. Height mh of the trailing end portion 70b is set to be greater than a height ph of the tip portion 66a of the main pole 66. Preferably, the length of the tip portion 66a transversely relative to the tracks should be greater than that of the spin-torque oscillator 90. In the present embodiment, the tip portion 66a of the main pole 66 is constricted from the leading side to the trailing side and further tapered, as shown in FIG. 18.

Also in the magnetic head constructed in this manner, lines of magnetic flux produced from a magnetic circuit that is interposed between the tip portion 66a of the main pole 66 and the return pole 68 flow at right angles to the entire film surface of the spin-torque oscillator 90, so that the oscillation properties of the oscillator 90 are satisfactory. Further, leakage of magnetic flux from the tip portion 66a of the main pole 66 to adjacent tracks can be suppressed by the side shields 70, so that degradation of information recorded in the adjacent tracks can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, sizes, etc., of the constituent elements of the head section may be changed if necessary. In the magnetic disk drive, moreover, the number of magnetic disks and heads may be varied as required, and the size of the magnetic disks may also be variously selected.

What is claimed is:

1. A magnetic head for perpendicular recording, comprising:
    a main pole comprising a tip portion facing a recording medium and configured to produce a magnetic field;
    a return pole on a trailing side and opposed to the main pole, a write gap disposed between the return pole and the main pole, wherein the return pole is configured to return magnetic flux from the main pole to form a magnetic circuit in conjunction with the main pole;
    a coil configured to excite the magnetic flux in the magnetic circuit comprising the main pole and the return pole;
    a spin-torque oscillator between the main pole and a surface of the return pole opposed thereto, configured to produce a high-frequency magnetic field; and
    side shields individually on opposite sides of the main pole transversely relative to a track, magnetically separated from the main pole, and located at a height position above the recording medium higher than the spin-torque oscillator.

2. The magnetic head of claim 1, wherein the side shields are integrated with the return pole and configured to protrude from the return pole.

3. The magnetic head of claim 2, wherein the side shields extend beyond the main pole toward a leading side.

4. The magnetic head of claim 3, wherein the side shields are connected to each other on the leading side of the main pole.

5. The magnetic head of claim 2, wherein the side shields are located at a height position above the recording medium higher than the tip portion of the main pole.

6. The magnetic head of claim 1, wherein the side shields are magnetically separate from the return pole on a leading side of the return pole.

7. The magnetic head of claim 6, wherein the side shields are located at a height position above the recording medium higher than the tip portion of the main pole.

8. The magnetic head of claim 1, wherein the side shields are located at a height position above the recording medium higher than the tip portion of the main pole.

9. The magnetic head of claim 1, wherein the spin-torque oscillator is between the tip portion and the return pole, parallel to the tip portion and the return pole, and at the same height above the recording medium as that of an end face of the tip portion.

10. The magnetic head of claim 9, wherein a length of the tip portion in a direction transverse relative to the track is greater than a length of the spin-torque oscillator in a direction transverse relative to the track.

11. A disk drive comprising:
 a disk recording medium comprising a recording layer having magnetic anisotropy perpendicular to a surface of the medium;
 a drive unit configured to support and rotate the recording medium; and
 a magnetic head comprising a slider comprising a facing surface opposed to the surface of the recording medium and a head section on one end portion of the slider, configured to process information for the recording medium,
 the head section comprising
  a main pole comprising a tip portion facing the recording medium and configured to produce a magnetic field,
  a return pole on a trailing side of the slider and opposed to the main pole wherein a write gap is disposed between the return ole and the main pole, wherein the return pole is configured to return magnetic flux from the main pole to form a magnetic circuit in conjunction with the main pole,
  a coil configured to excite the magnetic flux in the magnetic circuit comprising the main pole and the return pole,
  a spin-torque oscillator between the main pole and a surface of the return pole opposed thereto, configured to produce a high-frequency magnetic field, and
  side shields individually on opposite sides of the main pole transversely relative to a track, magnetically separated from the main pole, and located at a height position above the recording medium higher than the spin-torque oscillator.

12. The disk drive of claim 11, wherein the side shields are integrated with the return pole and configured to protrude from the return pole.

13. The disk drive of claim 12, wherein the side shields extend beyond the main pole toward a leading side.

14. The disk drive of claim 13, wherein the side shields are connected to each other on the leading side of the main pole.

15. The disk drive of claim 12, wherein the side shields are located at a height position above the recording medium higher than the tip portion of the main pole.

16. The disk drive of claim 11, wherein the side shields are magnetically separate from the return pole on a leading side of the return pole.

17. The disk drive of claim 16, wherein the side shields are located at a height position above the recording medium higher than the tip portion of the main pole.

18. The disk drive of claim 11, wherein the side shields are located at a height position above the recording medium higher than the tip portion of the main pole.

19. The disk drive of claim 11, wherein the spin-torque oscillator is between the tip portion and the return pole, parallel to the tip portion and the return pole, and at the same height above the recording medium as that of an end face of the tip portion.

20. The disk drive of claim 19, wherein a length of the tip portion in a direction transverse relative to the track is greater than a length of the spin-torque oscillator in a direction transverse relative to the track.

* * * * *